United States Patent [19]

Dunphy, Jr. et al.

[11] Patent Number: 4,989,205
[45] Date of Patent: Jan. 29, 1991

[54] DISK DRIVE MEMORY

[75] Inventors: Robert H. Dunphy, Jr., Holland, Pa.; Robert Walsh, Boulder, Colo.; John H. Bowers, Clarksburg, N.J.

[73] Assignee: Storage Technology Corporation, Louisville, Colo.

[21] Appl. No.: 463,591

[22] Filed: Jan. 11, 1990

Related U.S. Application Data

[62] Division of Ser. No. 212,434, Jun. 28, 1988, Pat. No. 4,914,656.

[51] Int. Cl.⁵ .............................................. G06F 11/10
[52] U.S. Cl. ................................... 371/10.1; 364/200; 371/40.1
[58] Field of Search ............ 371/10.1, 2.2, 40.1, 371/40.4, 11.1; 364/200, 900

[56] References Cited

U.S. PATENT DOCUMENTS

| | | | |
|---|---|---|---|
| 3,876,978 | 4/1975 | Bossen et al. | 371/51.1 |
| 4,653,050 | 3/1987 | Vaillancourt | 371/10.1 |
| 4,817,035 | 3/1989 | Timsit | 364/900 |
| 4,849,978 | 7/1989 | Dishon et al. | 371/10.1 |
| 4,870,643 | 9/1989 | Bultman et al. | 371/11.1 |

Primary Examiner—Charles E. Atkinson
Attorney, Agent, or Firm—Dorr, Carson, Sloan & Peterson

[57] ABSTRACT

The disk drive memory of the present invention uses a large plurality of small form factor disk drives to implement an inexpensive, high performance, high reliability disk drive memory that emulates the format and capability of large form factor disk drives. The plurality of disk drives are switchably interconnectable to form parity groups of N+1 parallel connected disk drives to store data thereon. The N+1 disk drives are used to store the N segments of each data word plus a parity segment. In addition, a pool of backup disk drives is maintained to automatically substitute a replacement disk drive for a disk drive in a parity group that fails during operation.

36 Claims, 4 Drawing Sheets

DISK DRIVE MEMORY

This is a divisional of application Ser. No. 07/212,434, filed June 28, 1988, now U.S. Pat. No. 4,914,656 issued on 4/3/90.

FIELD OF THE INVENTION

This invention relates to computer systems and, in particular, to an inexpensive, high performance, high reliability disk drive memory for use with a computer system.

PROBLEM

It is a problem in the field of computer systems to provide an inexpensive, high performance, high reliability memory that has backup capability. In computer systems, it is expensive to provide high reliability capability for the various memory devices that are used with a computer. This problem is especially severe in the case of disk drive memory systems. The typical commercially available disk drive is a 14-inch form factor unit, such as the IBM 3380J disk drive, that can store on the order of 1.2 gigabytes of data. The associated central processing unit stores data files on the disk drive memory by writing the entire data file onto a single disk drive. It is obvious that the failure of a single disk drive can result in the loss of a significant amount of data. In order to minimize the possibility of this occurring, the disk drives are built to be high reliability units. The cost of reliability is high in that the resultant disk drive is a very expensive unit.

In critical situations where the loss of the data stored on the disk drive could cause a significant disruption in the operation of the associated central processing unit, additional reliability may be obtained by disk shadowing-backing up each disk drive with an additional redundant disk drive. However, the provision of a second disk drive to backup the primary disk drive more than doubles the cost of memory for the computer system. Various arrangements are available to reduce the cost of providing disk shadowing backup protection. These arrangements include storing only the changes that are made to the data stored on the disk drive, backing up only the most critical data stored on the disk drive and only periodically backing up the data that is stored on the disk drive by storing it on a much less expensive data storage unit that also has a much slower data retrieval access time. However, none of these arrangements provide high reliability data storage with backup capability at a reasonable price.

An alternative to the large form factor disk drives for storing data is the use of a multiplicity of small form factor disk drives interconnected in a parallel array. Such an arrangement is the Micropolis Parallel Drive Array, Model 1804 SCSI that uses four, parallel, synchronized disk drives and one redundant parity drive. This arrangement uses parity protection, provided by the parity drive, to increase data reliability. The failure of one of the four data disk drives can be recovered from by the use of the parity bits stored on the parity disk drive. A similar system is disclosed in U.S. Pat. No. 4,722,085 wherein a high capacity disk drive memory is disclosed. This disk drive memory uses a plurality of relatively small, independently operating disk subsystems to function as a large, high capacity disk drive having an unusually high fault tolerance and a very high data transfer bandwidth. A data organizer adds seven error check bits to each 32 bit data word to provide error checking and error correction capability. The resultant 39 bit word is written, one bit per disk drive, on to 39 disk drives. In the event that one of the 39 disk drives fails, the remaining 38 bits of the stored 39 bit word can be used to reconstruct the 32 bit data word on a word-by-word basis as each data word is read from memory, thereby obtaining fault tolerance.

The difficulty with these parallel disk drive array arrangements is that there are no spare disk drives provided and the system reliability of such an architecture of n parallel connected disk drives with no spares is fairly low. While these disk drive memory systems provide some data reconstruction capability, the lack of backup or spare disk drive capability renders the maintenance cost of these systems high, since disk drive failures in such an architecture occur fairly frequently and each disk drive failure necessitates a service call to replace the failed disk drive. If a service call is not made before a second drive fails, there will be data loss. In addition, the use of a Hamming Code type of error detection and correction arrangement as suggested by U.S. Pat. No. 4,722,085 requires a high overhead 7 bits of error detection code for a 32 bit data word. These limitations render this architecture uneconomical for disk storage systems. A further limitation of the disk drive memory system of U.S. Pat. No. 4,722,085 is that this tightly coupled parallel disk drive array architecture uses tightly coupled disk actuators. This arrangement has a high data transfer bandwidth but effectively only a single actuator for 2.75 gigabytes of memory. This adversely affects the random access to memory performance of this disk drive memory system since all memory can only be accessed through the single actuator.

Therefore, there presently is no inexpensive, high performance, high reliability disk drive memory that has backup capability for computer systems.

SOLUTION

The above described problems are solved and a technical advance achieved in the field by the disk drive memory of the present invention. The disk drive memory of the present invention uses a large plurality of small form factor disk drives to implement an inexpensive, high performance, high reliability disk drive memory that emulates the format and capability of large form factor disk drives. The plurality of disk drives are switchably interconnectable to form parity groups of N+1 parallel connected disk drives to store data thereon. The N+1 disk drives are used to store the N segments of each data word plus a parity segment. In addition, a pool of backup disk drives is maintained to automatically substitute a replacement disk drive for a disk drive in a parity group that fails during operation.

The pool of backup disk drives provides high reliability at low cost. Each disk drive is designed so that it can detect a failure in its operation, which allows the parity segment can be used not only for error detection but also for error correction. Identification of the failed disk drive provides information on the bit position of the error in the data word and the parity data provides information to correct the error itself. Once a failed disk drive is identified, a backup disk drive from the shared pool of backup disk drives is automatically switched in place of the failed disk drive. Control circuitry reconstructs the data stored on the failed disk drive, using the remaining N−1 segments of each data word plus the associated parity segment. A failure in the parity segment does not require data reconstruction, but necessitates regeneration of the parity information. The reconstructed data is then written onto the substitute disk drive. The use of backup disk drives increases the reliability of the N+1 parallel disk drive architecture while the use of a shared pool of backup disk drives minimizes the cost of providing the improved reliability.

This architecture of a large pool of switchably interconnectable, small form factor disk drives also provides great flexibility to control the operational characteristics of the disk drive memory. The reliability of the disk drive memory system can be modified by altering the assignment of disk drives from the backup pool of disk drive to the data storage disk drive parity groups. In addition, the size of the parity group is controllable, thereby enabling a mixture of parity group sizes to be concurrently maintained in the disk drive memory. Various parity groups can be optimized for different performance characteristics. For example: the data transfer rate is proportional to the number of disk drives in the parity group; as the size of the parity group increases, the number of parity drives and spare drives available in the spare pool decrease; and as the size of the parity group increases the number of physical actuators/virtual actuator decreases.

Thus, the use of an amorphous pool containing a large number of switchably interconnectable disk drives overcomes the limitations of existing disk drive memory systems and also provides capabilities previously unavailable in disk drive memory systems.

In operation, the data transmitted by the associated central processing unit is used to generate parity information. The data and parity information is written across N+1 disk drives in the disk drive memory. In addition, a number of disk drives are maintained in the disk drive memory as spare or backup units, which backup units are automatically switched on line in place of disk drives that fail. Control software is provided to reconstruct the data that was stored on a failed disk drive and to write this reconstructed data onto the backup disk drive that is selected to replace the failed disk drive unit.

In response to the associated central processing unit writing data to the disk drive memory, a control module in the disk drive memory divides the received data into a plurality (N) of segments. The control module also generates a parity segment that represents parity data that can be used to reconstruct one of the N segments of the data if one segment is inadvertently lost due to a disk drive failure A disk drive manager in the disk drive memory selects N+1 disk drives from the plurality of disk drives in the disk drive memory to function as a parity group on which the data file and its associated parity segment is stored. The control module writes each of the N data segments on a separate one of N of the N+1 disk drives selected to be part of the parity group. In addition, the parity segment is written onto the remaining one of the selected disk drives. Thus the data and its associated parity information is written on N+1 disk drives instead of on a single disk drive. Therefore, the failure of a single disk drive will only impact one of the N segments of the data. The remaining N−1 segments of the data plus the parity segment that is stored on a disk drive can be used to reconstruct the missing or lost data segment from this data due to the failure of the single disk drive.

In this fashion, the parity information is used to provide backup for the data as is a plurality of backup disk drives. Instead of requiring the replication of each disk drive as in disk shadowing backup, the data is spread across a plurality of disk drives so that the failure of a single disk drive will only cause a temporary loss of 1/N of the data. The parity segment written on a separate disk drive enables the software in the disk drive memory to reconstruct the lost segment of the data on a new drive over a period of time. However, data can be reconstructed as needed in real time as needed by the CPU so that the original disk failure is transparent to the CIU. Therefore, the provision of one parity disk drive for every N data disk drives plus the provision of a pool of standby or backup disk drives provide full backup for all of the data stored on the disk drives in this disk drive memory. Such an arrangement provides high reliability at a reasonable cost which cost is far less than the cost of providing a duplicate backup disk drive as in disk shadowing or the high maintenance cost of prior disk drive memory array systems. The size of the pool of standby drives and the rate of drive failure determines the interval between required service calls. A sufficiently larger pool could allow service as infrequently as once per year or less, saving considerable costs. These and other advantages of this invention will be ascertained by a reading of the detailed description.

DETAILED DESCRIPTION OF THE DRAWING

Figure 1:
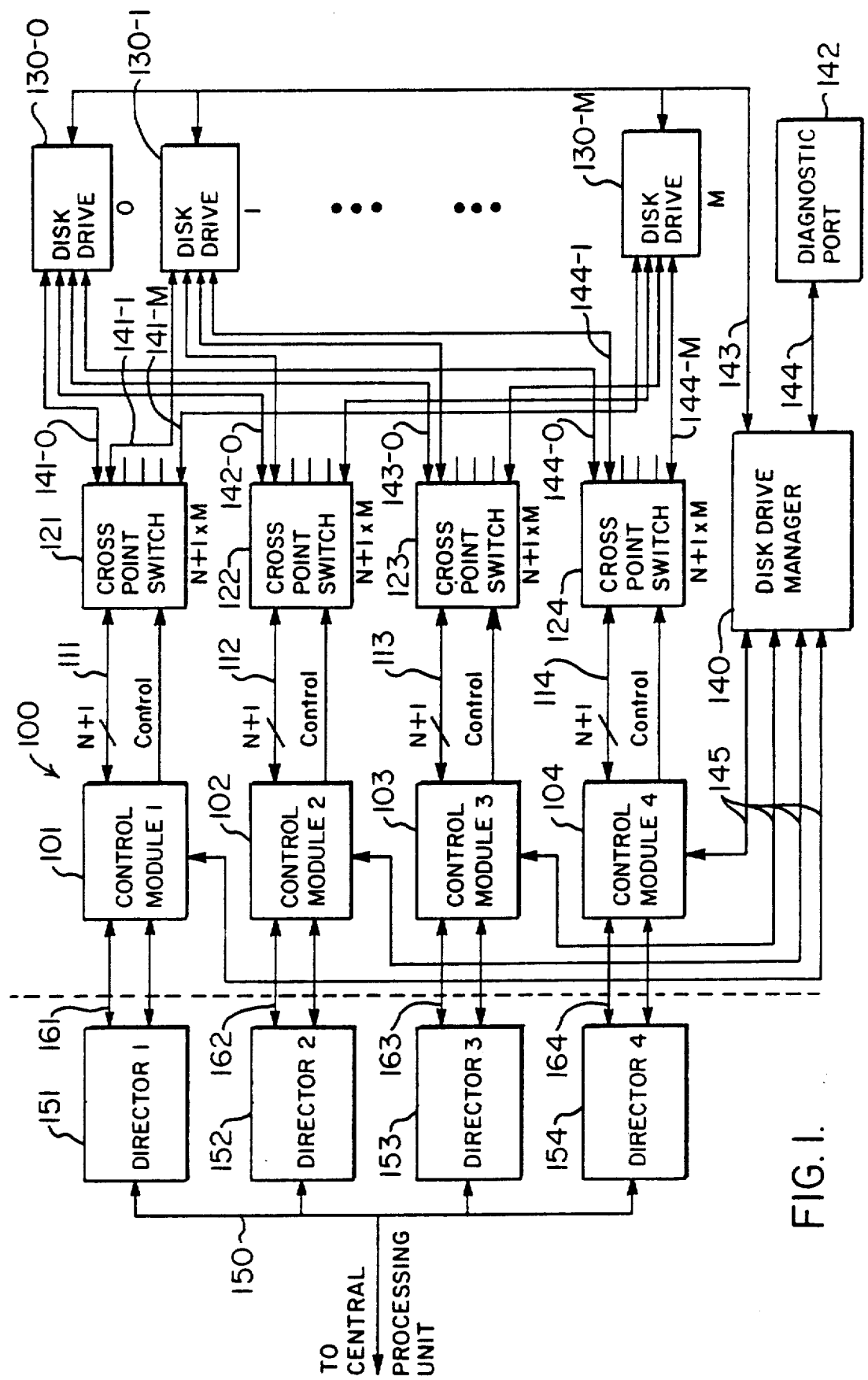
FIG. 1 illustrates in block diagram form the architecture of the disk drive memory.

The disk drive memory of the present invention uses a plurality of small form factor disk drives in place of the single disk drive to implement an inexpensive, high performance, high reliability disk drive memory that emulates the format and capability of large form factor disk drives. The plurality of disk drives are switchably interconnectable to form parity groups of N+1 parallel connected disk drives to store data thereon. The N+1 disk drives are used to store the N segments of each data word plus a parity segment. In addition, a pool of backup disk drives is maintained to automatically substitute a replacement disk drive for a disk drive that fails during operation.

The pool of backup disk drives provides high reliability at low cost. Each disk drive is designed so that it can detect a failure in its operation, which allows the parity segment to be used not only for error detection but also for error correction. Identification of the failed disk drive provides information on the bit position of the error in the data word and the parity data provides information to correct the error itself. Once a failed disk drive is identified, a backup disk drive from the shared pool of backup disk drives is automatically switched in place of the failed disk drive. Control circuitry reconstructs the data stored on the failed disk drive, using the remaining N−1 segments of each data word plus the associated parity segment A failure in the parity segment does not require data reconstruction, but necessitates regeneration of the parity information. The reconstructed data is then written onto the substitute disk drive. The use of backup disk drives increases the reliability of the N+1 parallel disk drive architecture while the use of a shared pool of backup disk drives minimizes the cost of providing the improved reliability.

This architecture of a large pool of switchably interconnectable, small form factor disk drives also provides great flexibility to control the operational characteristics of the disk drive memory. The reliability of the disk drive memory system can be modified by altering the assignment of disk drives from the backup pool of disk drives to the data storage disk drive parity groups. In addition, the size of the parity group is controllable, thereby enabling a mixture of parity group sizes to be concurrently maintained in the disk drive memory. Various parity groups can be optimized for different performance characteristics. For example: the data transfer rate is proportional to the number of disk drives in the parity group; as the size of the parity group increases, the number of parity drives and spare drives available in the spare pool decrease; and as the size of the parity group increases the number of physical actuators/virtual actuator decreases.

Thus, the use of an amorphous pool containing a large number of switchably interconnectable disk drives overcomes the limitations of existing disk drive memory systems and also provides capabilities previously unavailable in disk drive memory systems.

In operation, the data transmitted by the associated central processing unit is used to generate parity information. The data and parity information is written across N+1 disk drives in the disk drive memory. In addition, a number of disk drives are maintained in the disk drive memory as spare or backup units, which backup units are automatically switched on line in place of a disk drive that fails. Control software is provided to reconstruct the data that was stored on a failed disk drive and to write this reconstructed data onto the backup disk drive that is selected to replace the failed disk drive unit.

In response to the associated central processing unit writing data to the disk drive memory, a control module in the disk drive memory divides the received data into a plurality (N) of segments. The control module also generates a parity segment that represents parity data that can be used to reconstruct one of the N segments of the data if one segment is inadvertently lost due to a disk drive failure. A disk drive manager in disk drive memory selects N+1 disk drives from the plurality of disk drives in the disk drive memory to function as a parity group on which the data file and its associated parity segment is stored. The control module writes each of the N data segments on a separate one of N of the N+1 disk drives selected to be part of the parity group. In addition, the parity segment is written onto the remaining one of the selected disk drives. Thus, the data and its associated parity information is written on N+1 disk drives instead of on a single disk drive. Therefore, the failure of a single disk drive will only impact one of the N segments of the data. The remaining N−1 segments of the data plus the parity segment that is stored on a disk drive can be used to reconstruct the missing or lost data segment from this data due to the failure of the single disk drive.

In this fashion, the parity information is used to provide backup for the data as is a plurality of backup disk drives. Instead of requiring the replication of each disk drive as in disk shadowing backup, the data is spread across a plurality of disk drives so that the failure of a single disk drive will only cause a temporary loss of 1/N of the data. The parity segment written on a separate disk drive enables the software in the disk drive memory to reconstruct the lost segment of the data on a new drive over a period of time. However, data can be reconstructed as needed in real time as needed by the CPU so that the original disk failure is transparent to the CPU. Therefore, the provision of one parity disk drive for every N data disk drives plus the provision of a pool of standby or backup disk drives provide full backup for all of the data stored on the disk drives in this disk drive memory. Such an arrangement provides high reliability at a reasonable cost which cost is far less than the cost of providing a duplicate backup disk drive as in disk shadowing or the high maintenance cost of prior disk drive memory array systems.

Reliability

One measure of reliability is the function Mean Time Between Failures which provides a metric by which systems can be compared. For a single element having a constant failure rate f in failures per unit time, the mean time between failures is 1/f. The overall reliability of a system of n series connected elements, where all of the units must be operational for the system to be operational, is simply the product of the individual reliability functions. When all of the elements have a constant failure rate, the mean time between failures is 1/nf.

The reliability of an element is always less than or equal to 1 and the reliability of a series of interconnected elements is therefore always less than or equal to the reliability of a single element. To achieve high system reliability, extremely high reliability elements are required or redundancy may be used. Redundancy provides spare units which are used to maintain a system operating when an on-line unit fails. For an (n−k)/n standby redundant system the mean time between failures becomes (k+1)/f(n−k) where (n−k)/n refers to a system with n total elements, of which k are spares and only n-k must be functional for the system to be operational.

The reliability of a system may be increased significantly by the use of repair, which involves fixing failed units and restoring them to full operational capability. There are two types of repair: on demand and periodic On demand repair causes a repair operation with repair rate u to be initiated on every failure that occurs. Periodic repair provides for scheduled repairs at regular intervals, that restores all units that have failed since the last repair visit. More spare units are required for periodic repairs to achieve the same level of reliability as an on demand repair procedure but the maintenance process is simplified. Thus, high reliability can be obtained by the proper selection of a redundancy methodology and a repair strategy. Another factor in the selection of a disk drive memory architecture is the data reconstruction methodology. To detect two bit errors in an eight bit byte and to correct one requires five error check bits per eight bit data byte using a Hamming code. If the location of the bad bit were known, the data reconstruction can be accomplished with a single error check (parity) bit. The architecture of the disk drive memory of the present invention takes advantage of this factor to enable the use of a single parity bit for both error detection and error recovery in addition to providing flexibility in the selection of a redundancy and repair strategy to implement a high reliability disk drive memory that is inexpensive.

Disk Drive Memory Architecture

FIG. 1 illustrates in block diagram form the architecture of the preferred embodiment of disk drive memory 100. There are numerous alternative implementations possible, and this embodiment both illustrates the concepts of the invention and provides a high reliability, high performance, inexpensive disk drive memory. The disk drive memory 100 appears to the associated central processing unit to be a large disk drive or a collection of large disk drives since the architecture of disk drive memory 100 is transparent to the associated central processing unit. This disk drive memory 100 includes a plurality of disk drives 130-0 to 130-M, each of which is an inexpensive yet fairly reliable disk drive. The plurality of disk drives 130-0 to 130-M is significantly less expensive, even with providing disk drives to store parity information and providing disk drives for backup purposes, than to provide the typical 14 inch form factor backup disk drive for each disk drive in the disk drive memory. The plurality of disk drives 130-0 to 130-M are typically the commodity hard disk drives in the 5¼ inch form factor.

Each of disk drives 130-0 to 130-M is connected to disk drive interconnection apparatus, which in this example is the plurality of crosspoint switches 121-124 illustrated in FIG. 1. For illustration purposes, four crosspoint switches 121-124 are shown in FIG. 1 and these four crosspoint switches 121-124 are each connected to all of the disk drives 1300 to 130-M. Each crosspoint switch (example 121) is connected by an associated set of M conductors 141-0 to 141-M to a corresponding associated disk drive 130-0 to 130-M. Thus, each crosspoint switch 121-124 can access each disk drive 130-0 to 130-M in the disk drive memory via an associated dedicated conductor. The crosspoint switches 121-124 themselves are an N+1 by M switch that interconnects N+1 signal leads on one side of the crosspoint switch with M signal leads on the other side of the crosspoint switch 121. Transmission through the crosspoint switch 121 is bidirectional in nature in that data can be written through the crosspoint switch 121 to a disk drive or read from a disk drive through the crosspoint switch 121. Thus, each crosspoint switch 121-124 serves to connect N+1 of the disk drives 130-0 to 120-M in parallel to form a parity group. The data transfer rate of this arrangement is therefore N+1 times the data transfer rate of a single one of disk drives 130-0 to 130-M.

FIG. 1 illustrates a plurality of control modules 101-104, each of which is connected to an associated crosspoint switch 121-124. Each control module (example 101) is connected via N+1 data leads and a single control lead 111 to the associated crosspoint switch 121. Control module 101 can activate crosspoint switch 121 via control signals transmitted over the control lead to interconnect the N+1 signal leads from control module 101 to N+1 designated ones of the M disk drives 130-0 to 130-M. Once this interconnection is accomplished, control module 101 is directly connected via the N+1 data leads 111 and the interconnections through crosspoint switch 121 to a designated subset of N+1 of the M disk drives 130-0 to 130-M. There are N+1 disk drives in this subset and crosspoint switch 121 interconnects control module 101 with these disk drives that are in the subset via connecting each of the N+1 signal leads from control unit 101 to a corresponding signal lead associated with one of the disk drives in the subset. Therefore a direct connection is established between control unit 101 and N+1 disk drives in the collection of disk drives 130-0 to 130-M. Control unit 101 can thereby read and write data on the disk drives in this subset directly over this connection.

The data that is written onto the disk drives consists of data that is transmitted from an associated central processing unit over bus 150 to one of directors 151-154. The data file is written into for example director 151 which stores the data and transfers this received data over conductors 161 to control module 101. Control module 101 segments the received data into N segments and also generates a parity segment for error correction purposes. Each of the segments of the data are written onto one of the N disk drives in the selected subset An additional disk drive is used in the subset to store the parity segment. The parity segment includes error correction characters and data that can be used to verify the integrity of the data that is stored on the N disk drives as well as to reconstruct one of the N segments of the data if that segment were lost due to a failure of the disk drive on which that data segment is stored.

The disk drive memory illustrated on FIG. 1 includes a disk drive manager 140 which is connected to all of the disk drives 130-0 to 130-M via conductor 143 as well as to each of control modules 101-104 via an associated one of conductors 145-1 to 145-4. Disk drive manager 140 maintains data in memory indicative of the correspondence between the data read into the disk drive memory 100 and the location on the various disks 130-0 to 130-M on which this data is stored. Disk drive manager 140 assigns various ones of the disk drives 130-0 to 130-M to the parity groups as described above as well as assigning various disk drives to a backup pool. The identity of these N+1 disk drives is transmitted by disk drive manager 140 to control module 101 via conductor 145-1. Control module 101 uses the identity of the disk drives assigned to this parity group to activate crosspoint switch 121 to establish the necessary interconnections between the N+1 signal leads of control module 101 and the corresponding signal leads of the N+1 disk drives designated by disk drive manager 140 as part of this parity group.

Thus, disk drive memory 100 can emulate one or more large form factor disk drives (ex—a 3380 type of disk drive) using a plurality of smaller form factor disk drives while providing a high reliability capability by writing the data across a plurality of the smaller form factor disk drives A reliability improvement is also obtained by providing a pool of backup disk drives that are switchably interconnectable in place of a failed disk drive. Data reconstruction is accomplished by the use of the parity segment, so that the data stored on the remaining functioning disk drives combined with the parity information stored in the parity segment can be used by control software to reconstruct the data lost when one of the plurality of disk drives in the parity group fails. This arrangement provides a reliability capability similar to that obtained by disk shadowing arrangements at a significantly reduced cost over such an arrangement.

Disk Drive

Figure 2:
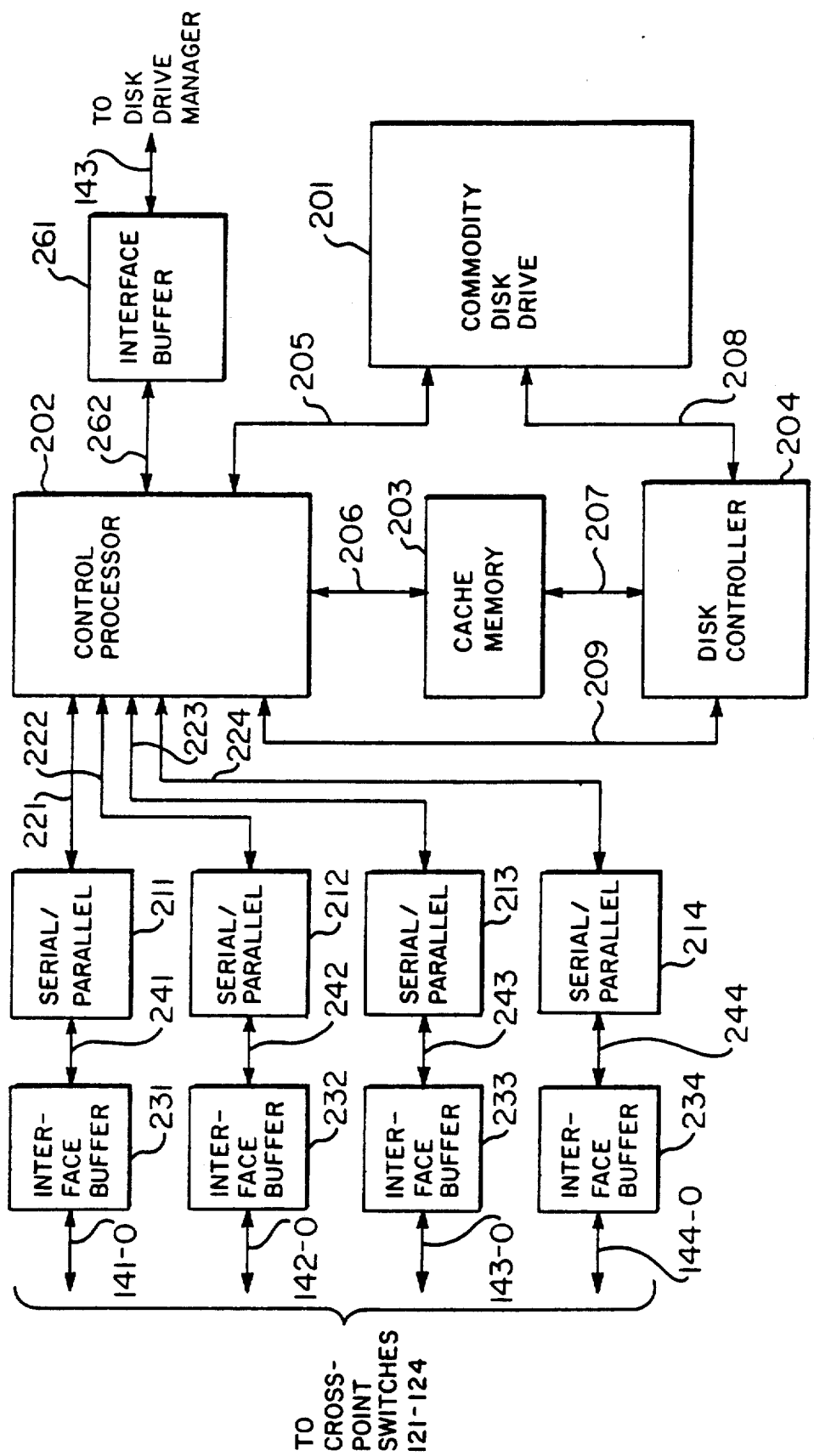
FIG. 2 illustrates the disk subsystem in block diagram form.

FIG. 2 is a block diagram of the disk drive 130-0. The disk drive 130-0 can be considered a disk subsystem that consists of a disk drive mechanism and its surrounding control and interface circuitry. The disk drive shown in FIG. 2 consists of a commodity disk drive 201 which is a commercially available hard disk drive of the type that typically is used in personal computers. Control processor 202 has control responsibility for the entire disk drive shown in FIG. 2. The control processor 202 monitors all information routed over the various data channels 141-0 to 144-0. The data channels 141-0 to 144-0 that interconnect the associated crosspoint switches 121-124 with disk drive 130-0 are serial communication channels. Any data transmitted over these channels is stored in a corresponding interface buffer 231-234 The interface buffers 231-234 are connected via an associated serial data channel 241-244 to a corresponding serial/parallel converter circuit 211-214. Control processor 202 has a plurality of parallel interfaces which are connected via parallel data paths 221-224 to the serial/parallel converter circuits 211-214. Thus, any data transfer between a corresponding crosspoint switch 121-124 and control processor 202 requires that the data be converted between serial and parallel format to correspond to the difference in interface format between crosspoint switches 121-124 and control processor 202. A disk controller 204 is also provided in disk drive 130-0 to implement the low level electrical interface required by the commodity disk drive 201. The commodity disk drive 201 has an ESDI interface which must be interfaced with control processor 202. Disk controller 204 provides this function. Thus, data communication between control processor 202 and commodity disk drive 201 is accomplished over bus 206, cache memory 203, bus 207, disk controller 204, bus 208. Cache memory 203 is provided as a buffer to improve performance of the disk drive 130-0. The cache is capable of holding an entire track of data for each physical data head in the commodity disk drive 201. Disk controller 204 provides serialization and deserialization of data, CRC/ECC generation, checking and correction and NRZ data encoding The addressing information such as the head select and other type of control signals are provided by control processor 202 and communicated over bus 205 to commodity disk drive 201. In addition, control processor 202 is connected by signal lead 262 to an interface buffer 261 which interconnects control processor 201 with signal lead 143 to disk drive manager 140. This communication path is provided for diagnostic and control purposes For example, disk drive manager 140 can signal control processor 202 to power commodity disk drive 201 down when disk drive 130-0 is in the standby mode. In this fashion, commodity disk drive 201 remains in an idle state until it is selected by disk drive manager 140 at which time disk drive manager 140 can activate the disk drive by providing the appropriate control signals over lead 143.

Control Module

Figure 3:
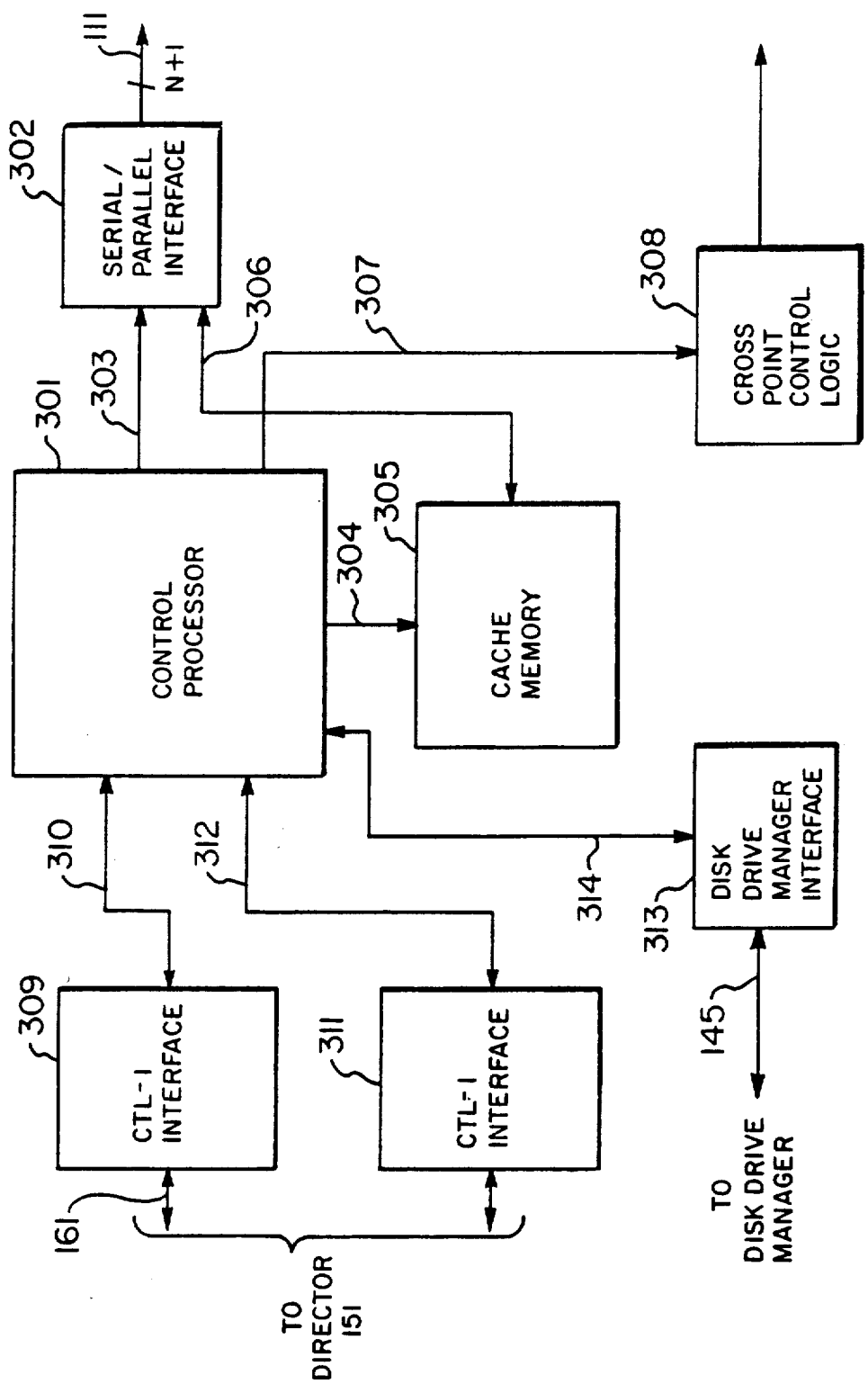
FIG. 3 illustrates the control module in block diagram form.

FIG. 3 illustrates control module 101 in block diagram form. Control module 101 includes a control processor 301 that is responsible for monitoring the various interfaces to director 151 and the associated crosspoint switch 121. Control processor 301 monitors CTL-I interface 309 and 311, for commands from director 151 and, when a command is received by one of these two interfaces 309, 311 control processor 301 reads the command over the corresponding signal lead 310, 312 respectively. Control processor 301 is connected by bus 304 to a cache memory 305 which is used to improve performance. Control processor 301 routes the command and/or data information received from director 151 to the appropriate disk groups through the N serial command/data interfaces illustrated as serial/parallel interface 302. Serial/parallel interface 302 provides N+1 interfaces where the N+1 data and control channels 111 that are connected to the associated crosspoint switch 121. Control processor 301 takes the data that is transmitted by director 151 and divides the data into N segments. Control processor 301 also generates a parity segment for error recovery purposes Control processor 301 is responsible for all gap processing in support of the count/key/data format as received from the associated central processing unit. Control processor 301 receives information from disk drive manager 140 over lead 145. This control data is written into disk drive manager interface 313 where it can be retrieved over lead 314 by control processor 301. The control information from disk drive manager 140 is data indicative of the interconnections required in crosspoint switch 121 to connect the N+1 data channels 111 of control module 101 with the selected N+1 disk drives out of the pool of disk drives 130-0 to 130-M. Thus, control processor 301 generates the N+1 data and parity segments and stores these in cache memory 305 to be transmitted to the N+1 selected disk drives In order to accomplish this transfer, control processor 301 transmits control signals over lead 307 via crosspoint control logic 308 to crosspoint switch 121 to indicate the interconnections required in crosspoint switch 121 to interconnect the N+1 signal channels 111 of control module 101 with the corresponding signal leads 141-0 to 141-M associated with the selected disk drives. Once the crosspoint control signals are transmitted to the associated crosspoint switch 121, the N+1 data plus parity segments are transmitted by control processor 301 outputting these segments from cache memory 305 over bus 306 through serial/parallel interface 302 onto the N+1 serial data channels 111.

Count/Key/Data and Address Translation

To support a 3380 image, the count/key/data format of the 3380 type of disk drive must be supported. The count/key/data information is stored on a physical track as data. The physical drives are formatted so that an integral number of virtual tracks are stored there, one per sector. To simulate the single density volume granularity of 630 MB, separate caches are provided for each control module track to allow parallel accesses by different control modules. For example, the single density 3380 track has a capacity of approximately 50 KB. If a parity group of 8 data disk drives +1 parity disk drive is used, 50/8 or 6.25 K is stored on each physical disk drive.

One of the primary responsibilities of the control modules is to translate virtual 3380 addresses to physical addresses. A virtual address consists of an actuator number, a cylinder number, a head number, and a target record. This is translated to the parity group number, the physical cylinder within the parity group, the head number and the sector index within the physical track to pick one of the four virtual tracks stored there. This is accomplished by first generating a "sequential cylinder index" from the virtual actuator number and virtual cylinder number:

SEQ CYL INDEX = VIRTUAL ACTUATOR
(#CYLINDER/ACTUATOR) + VIRTUAL CYLINDER

The physical group number that contains the data is found by taking the integer value that results from dividing the sequential cylinder index by the number of virtual cylinders per physical group:

$$\text{GROUP} = \text{INT}\left(\frac{\text{SEQ CYL INDEX}}{\text{\#VIRTUAL CYL PER GROUP}}\right)$$

For example, if we assume there are 4 virtual tracks per physical track, then given the 1632 tracks that are contained in a typical disk drive there are $4 \times 1632 = 6528$ virtual tracks per group. The physical cylinder within the appropriate group that contains the desired data is found by taking the integer value that results from dividing the difference between the sequential cylinder index and the base cylinder index for the particular group by the number of virtual tracks per physical track:

PHYSICAL CYL =

$$\text{INT}\left(\frac{\frac{\text{SEQ CYL INDEX} - \text{GROUP} \cdot}{\text{\#VIRTUAL CYL PER GROUP}}}{\text{\#VIRTUAL TRACKS PER PHYSICAL TRACK}}\right)$$

Because both the 3380 and the typical disk drive units contain 15 data heads per actuator, the physical head value is the numerical equivalent of the virtual head value. The index into the physical track to identify the specific virtual track is given by the remainder of the physical cylinder calculation given above:

SECTOR INDEX =

$$\text{REM}\left(\frac{\frac{\text{SEQ CYL INDEX} - \text{GROUP} \cdot}{\text{\#VIRTUAL CYL PER GROUP}}}{\text{\#VIRTUAL TRACKS PER PHYSICAL TRACK}}\right)$$

The above calculations uniquely identify a single virtual track in the physical implementation. The virtual target record is then used to process the virtual track for the specific information requested. Therefore, the disk drive memory maintains a mapping between the desired 3380 image and the physical configuration of the disk drive memory. This mapping enables the disk drive memory to emulate whatever large form factor disk drive that is desired.

Disk Drive Manager

Figure 4:
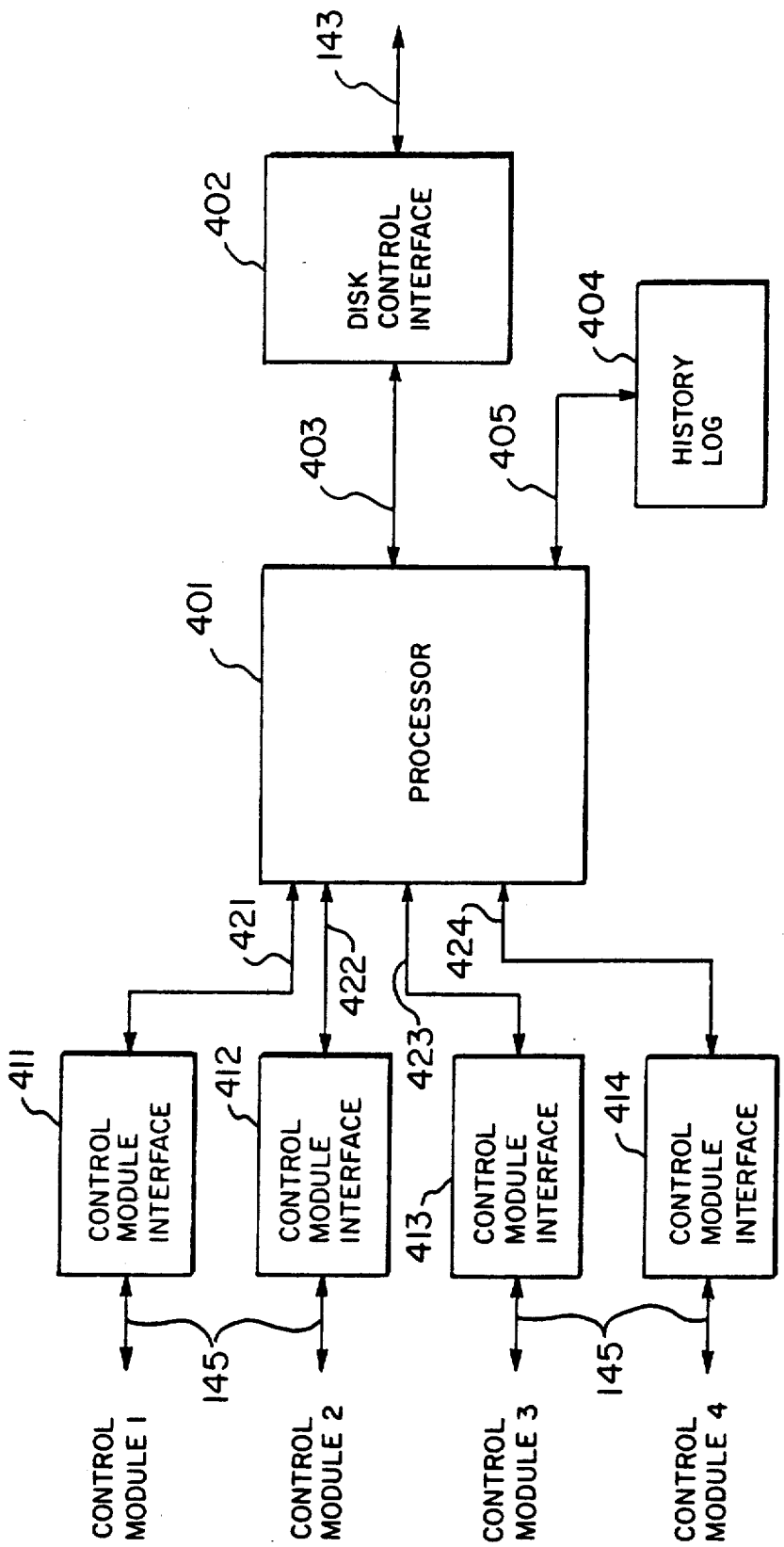
FIG. 4 illustrates the disk manager in block diagram form.

FIG. 4 illustrates the disk drive manager in block diagram form. The disk drive manager 140 is the essential controller for the entire disk drive memory illustrated in FIG. 1. Disk drive manager 140 has separate communication paths to each of control modules 101-104 via associated control module interfaces 411-414. In addition, disk drive manager 140 has a communication path to each of the disk drives 130-0 to 130-M in the disk drive memory independent of the crosspoint switches 121-124. The disk drive manager 140 also has primary responsibility for diagnostic activities within this architecture of the disk drive memory and maintains all history and error logs in history log memory 404. The central part of disk drive manager 140 is processor 401 which provides the intelligence and operational programs to implement these functions. Processor 401 is connected via busses 421-424 with the associated control module interfaces 411-414 to communicate with control modules 101-104 respectively. In addition, bus 403 connects processor 401 with disk control interface 402 that provides a communication path over lead 143 to all of the disk drives 130-0 to 130-M in the disk drive memory. The history log 404 is connected to processor 401 via bus 405. Processor 401 determines the mapping from virtual to physical addressing in the disk drive memory and provides that information to control modules 101-104 over the corresponding signal leads 145. Processor 401 also maintains the pool of spare disk drives and allocates new spares when disk failures occur when requested to do so by the affected control module 101-104.

At system powerup, disk drive manager 140 determines the number of spare disk drives that are available in the disk drive memory. Based on system capacity requirements, disk drive manager 140 forms parity groups out of this pool of spare disk drives. The specific information of which physical disk are contained in a parity group is stored in local memory in disk drive manager 140 and a copy of that information is transmitted to each of control modules 101-104 so that these control modules 101-104 can translate the virtual addresses received with the data from the associated central processing unit to physical parity groups that consist of the corresponding selected disk drives Because of the importance of the system mapping information, redundant copies protected by error correction codes are stored in non-volatile memory in disk drive manager 140. When a request for a specific piece of information is received by a control module 101-104 from a storage director 151-154 the control module 101-104 uses the system mapping information supplied by disk drive manager 140 to determine which physical disk group contains the data. Based on this translation information, the corresponding control module 101 sets the associated crosspoint switch 121 to interconnect the N+1 data channels 111 of control module 101 with selected disk drives identified by this translation information. In the case where the associated central processing unit is writing data into the disk drive memory, the control module divides the data supplied by the central processing unit into N segments and distributes it along with a parity segment to the individual members of the parity group. In a situation where a dat is read from the disk drive memory to the central processing unit, the control module must perform the inverse operation by reassembling the data streams read from the selected disk drives in the parity group.

Disk Drive Malfunction

The control module determines whether an individual disk drive in the parity group it is addressing has malfunctioned. The control module that has detected a bad disk drive transmits a control message to disk drive manager 140 over the corresponding control signal lead 145 to indicate that a disk drive has failed, is suspect or that a new disk drive is needed. When a request for a spare disk drive is received by the disk drive manager 140, the faulty disk drive is taken out of service and a spare disk drive is activated from the spare pool by the disk drive manager 140. This is accomplished by rewriting the identification of that parity group that contains the bad disk drive. The new selected disk drive in the parity group is identified by control signals which are transmitted to all of control modules 101-104. This insures that the system mapping information stored in each of control modules 101-104 is kept up to date.

Once the new disk drive is added to the parity group, it is tested and, if found to be operating properly, it replaces the failed disk drive in the system mapping tables. The control module that requested the spare disk drive reconstructs the data for the new disk drive using the remaining N−1 operational data disk drives and the available parity information from the parity disk drive. Before reconstruction is complete on the disk, data is still available to the CPU, it must be reconstructed on line rather than just reading it from the disk. When this data reconstruction operation is complete, the reconstructed segment is written on the replacement disk drive and control signals are transmitted to the disk drive manager 140 to indicate that the reconstruction operation is complete and that parity group is now again operational. Disk drive manager 140 transmits control signals to all of the control modules in the disk drive memory to inform the control modules that data reconstruction is complete so that that parity group can be accessed without further data reconstruction.

This dynamically reconfigurable attribute of the disk drive memory enables this system to be very flexible. In addition, the dynamically configurable aspect of the communication path between the control modules and the disk drives permits the architecture to be very flexible With the same physical disk drive memory, the user can implement a disk drive memory that has a high data storage capacity and which requires shorter periodic repair intervals, or a disk drive memory that has a lower data storage capacity with longer required repair intervals simply by changing the number of active disk drive parity groups. In addition, the disk drive memory has the ability to detect new spare disk drives when they are plugged in to the system thereby enabling the disk drive memory to grow as the storage or reliability needs change without having to reprogram the disk drive memory control software.

Architectural Trade-Offs

There are a variety of trade-offs that exist within this disk drive memory architecture. The parameters that may be varied include system reliability, system repair interval, system data storage capacity and parity group size. Each parameter, when varied to cause one aspect of the system performance to improve, typically causes another characteristic of the system to worsen. Thus, if one lowers the system reliability, then fewer spare disk drives are required and there will be a higher system failure rate, i.e. more frequent data loss. A user can reduce the periodic repair interval. This reduces the number of spare disk drives required in the disk drive memory but causes increased maintenance costs. Similarly, if the data storage capacity requirements of the disk drive memory are reduced, fewer spare disk drives are required because of the reduced number of active disk drives. There is an approximately linear relationship between the data storage capacity of the disk drive memory and the number of spare disk drives required for a fixed reliability. Another variable characteristic is the size of the parity group. As the size of the parity group becomes larger, there is less disk drive overhead because fewer groups are required for a given amount of data storage capacity and one parity disk is required per group regardless of its size. The instantaneous data rate is larger from a large parity group because of the increased number of disk drives operating in parallel. However, the larger group size reduces the reliability of the spare swap process due to the fact that there is an increased probability of more than one disk drive failing at the same time. This also reduces the number of distinct physical actuators that may do simultaneous seeks of data on the disk drives.

While a specific embodiment of this invention has been disclosed herein, it is expected that those skilled in the art can design other embodiments that differ from this particular embodiment but fall within the scope of the appended claims.

I claim:

1. A disk memory system (100) for storing data files for associated data processing devices comprising:
   a plurality of disk drives (130-0 to 130-M);
   means (140) for assigning a subset of said plurality of disk drives into two or more parity groups, each parity group consisting of two or more disk drives, the size of the parity group being one of at least two different parity group sizes in said two or more parity groups;
   means (101) responsive to the receipt of a data file from said associated data processing devices for selecting one of said parity groups to store said data file thereon;
   means (161, 101, 111, 121, 141-\*) for writing said received data file and parity data associated with said received data file in segments across said two or more disk drives in said selected parity group;
   means (140) for reserving one or more of said plurality of disk drives as backup disk drives, which backup disk drives are shared in common by said two or more parity groups.

2. The system (100) of claim 1 further including:
   means (101, 140) for identifying one of said disk drives in said subset that fails to function; and
   means (140, 145, 313, 314, 301, 307, 308, 121, 141-\*) responsive to said identifying means for switchably connecting one of said backup disk drives in place of said identified failed disk drive;
   means (**301, 302, 111, 121, 141-\*, 130-\***) for reconstructing the segment of said data file written on said identified failed disk drive, using said associated parity data.

3. The system (100) of claim 2 further including:
   means (301, 302, 111, 121, 141-\*) for writing said reconstructed segment of said data file on to said one backup disk drive.

4. The system (100) of claim 2 wherein said reconstructing means (**301, 302, 111, 121, 141-\*, 130-\***) includes:
   means (301) for generating said segment written on said identified failed disk drive using said associated parity data and the remainder of said data file.

5. The system (100) of claim 1 wherein said writing means (161, 101, 111, 121, 141-\*) includes:
   means (301) for dividing said data file into two or more segments; and
   means (301) for generating parity data for said segmented data file.

6. The system (100) of claim 5 wherein said writing means (161, 101, 111, 121, 141-\*) further includes:
   means (301-308, 111, 121, 141-\*) for writing each of said segments and said parity data on to a different one of said two or more disk drives in said selected parity group.

7. The system (100) of claim 1 further including:
means (401, 411-414, 421-424, 145, 101-104) for maintaining data indicative of the correspondence between said data file and the identity said two or more disk drives in said selected parity group.

8. The system (100) of claim 1 further including:
means (101, 111, 121, 141-*, 130-*) responsive to a request for said data file from one of said associated data processing devices for reconstruct said segments of said data file.

9. The system (100) of claim 8 further including:
means (261, 143) responsive to said reconstructing means for transmitting said concatenated segments of said data file to said requesting data processing device.

10. A method of storing data files for data processing devices on an associated disk memory system that includes a plurality of disk drives comprising the steps of:
assigning a subset of said plurality of disk drives into two or more parity groups, each parity group consisting of two or more disk drives, the size of the parity group being one of at least two different parity group sizes in said two or more parity groups;
selecting, in response to the receipt of a data file from said processing devices, one of said parity groups to store said received data file thereon;
writing said received data file and parity data associated with said received data file across said two or more disk drives of said selected parity group;
reserving one or more of said plurality of disk drives as backup disk drives, said backup disk drives shared in common by said parity groups.

11. The method of claim 10 further including the step of:
identifying one of said disk drives in said subset that fails to function;
switchably connecting one of said backup disk drives in place of said identified failed disk drive;
reconstructing the segment of said data file written on said identified failed disk drive, using said associated parity data.

12. The method of claim 11 further including the step of:
writing said reconstructed segment of said data file on to said one backup disk drive.

13. The method of claim 11 wherein said step of reconstructing includes the steps of:
identifying said failed disk drive; and
generating said segment written on said failed disk drive using said associated parity data and the remainder of said data file 14. The method of claim 11 wherein said step of writing includes the steps of:
dividing said data file into one or more segments; and
generating parity data for said segmented data file.

15. The method of claim 14 wherein said step of writing further includes the step of:
writing each of said segments and said parity data on to a different one of said two or more disk drives.

16. The method of claim 10 further including the step of:
maintaining data indicative of the correspondence between said data file and the identity said two or more disk drives.

17. The method of claim 10 further including the step of:
concatenating, in response to a request for said data file from one of said associated data processing devices, said segments of said data file.

18. The method of claim 17 further including the step of:
transmitting said concatenated segments of said data file to said requesting data processing device.

19. A disk memory system (100) for storing data files for associated data processing devices comprising
a plurality of disk drives (130-0 to 130-M);
means (140) for receiving one or more of said plurality of disk drives as backup disk drives, which backup disk drives are shared in common by said parity groups;
means (140) for assigning a subset of said disk drives into two or more parity groups, each parity group consisting of two or more disk drives, the size of the parity group being one of at least two different parity group sizes in said two or more parity groups;
means (101) responsive to the receipt of one of said data files from said associated data processing devices for selecting one of said parity groups to store said received data file thereon;
means (161, 101, 111, 121, 141-*) responsive to said selecting means for writing said received data file and parity data associated with said received data file across said two or more disk drives in said selected parity group.

20. The system (100) of claim 19 further including:
means (101, 140) for identifying one of said two or more disk drives in said parity group that fails to function;
means (140, 145, 313, 314, 301, 307, 308, 121, 141-*) for switchably connecting one of said backup disk drives in place of said identified failed disk drive;
means (301, 302, 111, 121, 141-*, 130-*) for reconstructing the segment of said data file written on said identified failed disk drive, using said associated parity data.

21. The system (100) of claim 20 further including:
means (301, 302, 111, 121, 141-*) for writing said reconstructed segment of said data file on to said one backup disk drive.

22. The system (100) of claim 20 wherein said reconstructing means (301, 302, 111, 121, 141-*, 130-*) includes:
means (301) for generating said segment written on said identified failed disk drive using said associated parity data and the remainder of said data file.

23. The system (100) of claim 21 wherein said writing means (161, 101, 111, 121, 141-*) includes:
means (301) for dividing said data file into one or more segments; and
means (301) for generating parity data for said segmented data file.

24. The system (100) of claim 23 wherein aid writing means (301, 302, 111, 121, 141-*) further includes:
means (301-308, 111, 121, 141-*) for writing each of said segments and said parity data on to a different one of said two or more disk drives in said selected parity group.

25. The system (100) of claim 19 further including:
means (401, 411-414, 421-424, 145, 101-104) for maintaining data indicative of the correspondence between said received data file and the identity said two or more disk drives in said selected parity group.

26. The system (100) of claim 19 further including means (161, 101, 111, 121, 141-*, 130-*) responsive to a request for said data file from one of said associated data processing devices for concatenating said segments of said data file.

27. The system (100) of claim 26 further including:
means (261, 143) responsive to said concatenating means for transmitting said concatenated segments of said data file to said requesting data processing device.

28. A method of storing data files on a disk memory system that includes a plurality of disk drives, for an associated data processing devices comprising the steps of:
reserving one or more of said plurality of disk drives as backup disk drives, which backup disk drives are shared in common by said parity groups;
assigning a subset of said disk drives into two or more parity groups, each said parity group consisting of two or more disk drives, the size of the parity group being one of at least two different parity group sizes in said two or more parity groups;
selecting one of said parity groups in response to the receipt of a data file from said associated data processing devices for storing said received data file thereon;
writing said received data file and parity data associated with said received data file across said two or more disk drives in said selected parity group.

29. The method of claim 28 further including the step of:
identifying one of said disk drives in said selected parity group that fails to function;
switchably connecting one of said backup disk drives in place of said identified failed disk drive
reconstructing the segment of said received data file written on said identified failed disk drive, using said associated parity data.

30. The method of claim 29 further including the step of:
writing said reconstructed segment of said data file on to said one backup disk drive.

31. The method of claim 28 wherein said step of reconstructing includes the steps of:
identifying said failed disk drive; and
generating said segment written on said failed disk drive using said associated parity data and the remainder of said data file.

32. The method of claim 28 wherein said step of writing includes the steps of:
dividing said data file into two or more segments; and
generating parity data for said segmented data file.

33. The method of claim 32 wherein said step of writing further includes the step of:
writing each of said segments and said parity data on to a different one of said two or more disk drives.

34. The method of claim 28 further including the step of:
maintaining data indicative of the correspondence between said data file and the identity said two or more disk drives.

35. The method of claim 28 further including the step of:
concatenating, in response to a request for said data file from one of said associated data processing devices, said segments of said data file.

36. The method of claim 35 further including the step of:
transmitting said concatenated segments of said data file to said requesting data processing device.

* * * * *